US008116243B2

(12) United States Patent
Zhiying et al.

(10) Patent No.: US 8,116,243 B2
(45) Date of Patent: Feb. 14, 2012

(54) WIRELESS SENSOR NETWORK AND ADAPTIVE METHOD FOR MONITORING THE SECURITY THEREOF

(75) Inventors: Yao Zhiying, Daejon (KR); Yoonmee Doh, Daejon (KR); Sung Joong Kim, Daejon (KR); Cheol-Sig Pyo, Daejon (KR); Jong-Suk Chae, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 317 days.

(21) Appl. No.: 11/539,084

(22) Filed: Oct. 5, 2006

(65) Prior Publication Data

US 2008/0084294 A1 Apr. 10, 2008

(51) Int. Cl.
*H04B 7/00* (2006.01)
*H04L 12/28* (2006.01)
*H04L 29/06* (2006.01)
*H04L 9/08* (2006.01)
*H04W 4/00* (2009.01)
*G08B 1/08* (2006.01)
*G06F 15/18* (2006.01)

(52) U.S. Cl. ... 370/310; 370/254; 370/338; 340/539.22; 706/12; 713/160; 380/286

(58) Field of Classification Search ............... 370/310
See application file for complete search history.

(56) References Cited

U.S. PATENT DOCUMENTS

| 6,052,469 | A * | 4/2000 | Johnson et al. ............ 380/286 |
| 2005/0154882 | A1 * | 7/2005 | Struik ....................... 713/160 |
| 2006/0055508 | A1 | 3/2006 | Kumar et al. |
| 2006/0098608 | A1 * | 5/2006 | Joshi ......................... 370/338 |
| 2008/0031155 | A1 * | 2/2008 | Korus et al. ................ 370/254 |
| 2008/0126272 | A1 * | 5/2008 | Cunningham ............... 706/12 |

FOREIGN PATENT DOCUMENTS

| JP | 2005-295543 | 10/2005 |
| KR | 10-2005-0024368 | 3/2005 |
| WO | 2005-101787 | 10/2005 |

OTHER PUBLICATIONS

Yao et al., "A Security Framework with Trust Management for Sensor Networks", 1st International Conference, on Security and Privacy for Emerging Areas in Communication Networks, Sep. 2005.*

(Continued)

*Primary Examiner* — Dwayne Bost
*Assistant Examiner* — Timothy Pham
(74) *Attorney, Agent, or Firm* — H.C. Park & Associates, PLC

(57) ABSTRACT

The present invention relates to a sensor network having node architecture for performing trust management of neighboring sensor nodes, and to an adaptive method for performing trust management of neighboring sensor nodes for monitoring security in the sensor network. The sensor network includes a base station and a plurality of sensor nodes for reporting sensed information packets to the base station through radiofrequency signals relayed by other sensor nodes. A judge sensor node may have a trust estimator in its node architecture to evaluate trustworthiness of a neighboring suspect sensor node by determining a personal reference and receiving personal references from jury sensor nodes. Based on the trustworthiness of the suspect, the judge may modify a route for transmitting packets to the base station.

13 Claims, 7 Drawing Sheets

OTHER PUBLICATIONS

C. Karlof, et al., "Secure Routing in Wireless Sensor Networks: Attacks and Countermeasures", Proceedings of First IEEE International Workshop on Sensor Network Protocols and Applications, 2003, pp. 1-15.

J. Deng, et al., "INSENS: Intrusion-Tolerant Routing in Wireless Sensor Network", Technical Report CUCS-939-02, Department of Computer Science, University of Colorado, 2002, pp. 1-18.

A. Perrig, et al., "SPINS: Security Protocols for Sensor Networks", Proceedings of the Seventh Annual International Conference on Mobile Computing and Networking, 2002, pp. 1-11.

D. Ganesan, et al., "Highly Resilient, Energy Efficient Multipath Routing in Wireless Sensor Networks", Mobile Computing and Communication Review, No. 2, 2002, pp. 1-13.

* cited by examiner

```
&neighborInfor = (
    &neighborDescriptor = (
        neiID
        neiLocation
    )
    &neighborRelation = (
            //parent towards base station
            //parentAlternative used once parent fails
            //child deviates from base station
            neiDuty = < parent, child, parentAlternative >
            //dedicated key with the local node
            neiKey
            //Defined by adopted routing protocol
            routingMetric
    )
    &neighborTrust = (
            //for computing $T_{po}$
            latestCommTimestamp
            //for computing $T_{re}$
            noOfReplyFromBS
            //for computing $T_{coo}$
            noOfCorrectForward
            neiTrustValue
    )
)
```

FIG. 2

```
when judge j receives a packet from suspect i
if hsn_{t_1} = H^1(hsn_{t_2}) then
    T_or(i) = 1              // it is from base station, and with
    correct order
    exit
else
    Ω = [δ(t_2 − t_1)]
    k = 2
    while k < Ω do
        compute H^k(hsn_{t_2})
        if hsn_{t_1} == H^k(hsn_{t_2}) then
            compute F(k)
            T_or(i) = F(k)     // it is from base station,
            but (k-1) packets are lost
            exit
        else
            k++
        end if
    end while
    T_or(i) = 0              // it is a spurious packet
end if
END
Notations
   F : a decay function with field (0,1), which is a punitive
measures towards i due to packet loss. For Example, we can
use $e^{-\lambda k}$ to design the function
   H : a hash function
   $H^k$ : a times operation with H
   δ : the times that H can be executed in one unit time
interval
   $t_1$ : the time previous packet received from i
   $t_2$ : the time current packet received from i
   Ω : the maximum operation times of H between $t_1$ and $t_2$
   $hsn_{t_1}$ : the corresponding one stored in judge j
   $hsn_{t_2}$ : the HSN appended in the current packet
```

FIG. 5

WIRELESS SENSOR NETWORK AND ADAPTIVE METHOD FOR MONITORING THE SECURITY THEREOF

BACKGROUND OF THE INVENTION

1. Field of the Invention

The present invention relates to a sensor network and to an adaptive method for monitoring security in the sensor network, and more specifically, to a sensor network having node architecture for performing trust management of neighboring sensor nodes, and to an adaptive method for performing trust management of neighboring sensor nodes.

2. Discussion of the Background

Wireless sensor networks, a type of ubiquitous computing, offer various novel applications. A wireless sensor network may rely on the use of tiny sensors, referred to as sensor nodes or nodes, embedded in the environment. The sensor nodes may have limited power, low memory storage capabilities, and limited processing power. However, each sensor node may have a radio transceiver. Therefore, the sensor nodes may collect, store, receive, and transmit information via radio transmissions without any fixed infrastructure.

A wireless sensor network may include a base station and sensor nodes arranged randomly or in a pattern to monitor such conditions as room temperatures, real-time traffic, security conditions such as fire in office buildings, to perform military surveillance, or any combination thereof. The sensor nodes may transmit data messages in the form of packets representing these sensed conditions to the base station as radio signals transmitted from the radio transmitter in each sensor node.

However, because sensor nodes are generally tiny and usually have very limited resources including processing capacity, power and memory, they frequently cannot transmit a packet directly to the base station, which may be positioned extremely long distances from the sensor node and outside the range of the sensor node's radio transmitter. Therefore, sensor nodes use a system referred to as relaying to transmit a packet to the base station. Specifically, a sensor node may store data in an internal memory relating to a parent node. The parent node may be an intermediate intended recipient of a sensor node's signal, and the parent node may be one hop, or message transmission, closer to the base station than the sensor node. The parent node may also have a parent node, which is also one hop, or message transmission, closer to the base station. By this method, a sensor node may relay a packet to the base station. Because the base station may have better resources than the sensor node, the base station may be connected to a local area network, a wireless network, the internet, or another type of network or network terminal, and may be able to transmit the packets received from the sensor nodes of the sensor network to a computer terminal, data collection facility, or other type of end user.

Any sensitive data in the packets must be protected to ensure the packets are transmitted from a sensor node to the base station without loss of information authenticity, confidentiality or integrity. In some military applications, security may be critical to successful completion of a military mission.

When designing a security protocol for a wireless sensor network, the unique nature of the wireless sensor network is considered. For example, a wireless sensor network may be application-oriented to performing specific sensing operations. Additionally, each sensor node in a wireless sensor network may possess limited battery power, small memory storage size, and low power computing capacity. Finally, sensor nodes may transmit packets containing critical information over an insecure wireless network, thus making sensor nodes more susceptible to various attacks. These attacks are documented in Karlof, C., Wagner, U., "Secure routing in wireless sensor networks: Attacks and countermeasures", Proceedings of First IEEE International Workshop on Sensor Network Protocols and Applications, 2003. Such attacks may include spoofed, altered, or replayed routing information to increase a traffic load, selective forwarding of packets, sinkhole attacks where traffic is routed through a malicious or compromised node, sybil attacks where a node represents itself as many nodes to other nodes, wormhole attacks where nodes two are incorrectly convinced that they are neighbors, HELLO flood attacks where a malicious node may appear as a neighbor to every node in a network, and acknowledgement spoofing where nodes receive incorrect acknowledgements to determine a strength of a link between two nodes. Other attacks may pose a risk to a wireless sensor network and this list of possible attacks is not intended to be exhaustive.

Conventional efforts towards improving the security of a wireless sensor network focus primarily on cryptographical schemes for encoding data embedded in the packets. See, for example, Deng, J., Han, R., and Mishra, S., "INSENS: Intrusion-tolerant routing in wireless Sensor Network", Technical Report CUCS-939-02, Department of Computer Science, University of Colorado, 2002; and Perrig, A., Szewczyk, R., Wen, V., Cullar, D, Tygar, J., "SPINS: Security protocols for sensor networks", Proceedings of the Seventh Annual International Conference on Mobile Computing and Networking, 2002.

However, these cryptographical schemes still suffer from many security vulnerabilities, such as an adversary's capture of sensor nodes and denial-of-service (DOS) attacks. Due to the unique characteristics of sensor nodes, wired network security solutions may not be applicable for wireless sensor networks. Cryptographical hashing mechanisms for wired network security have been applied to wireless sensor networks with certain modifications.

From an intrusion prevention perspective, SPINS, mentioned above, consists of Secure Network Encryption protocol (SNEP) and a micro-version of Timed, Efficient, Streaming, Loss-tolerant Authentication (µTESLA) Protocol. SNEP may provide confidentiality, two-party authentication, integrity and data freshness by encrypting an eight byte code into a message transmitted by packet. This code may include an encryption key, a counter shared by the sender and receiver of the message, and a message authentication code (MAC). Therefore, there is an additional resource load for each packet transmission. The µTESLA protocol offers data broadcast authentication similar to the data broadcast authentication provided by TESLA. However, TESLA requires significant resources at the message origination location to generate the lengthy authentication codes. The µTESLA protocol modifies the TESLA protocol by generating authentication codes as function of a one-way function such as a cryptographic hash function and by using symmetric cryptography mechanisms. Further, the authentication codes are not transmitted as a component of each message but are regularly transmitted independently of messages.

SPINS discloses node architecture for providing security to resource-constrained senor nodes with symmetric cryptography mechanisms. However there are drawbacks to the SPINS strategy. For example, SPINS provides little protection against an adversary's capture of sensor nodes and denial-of-service (DOS) attacks where malicious sensor nodes disrupt service.

For intrusion tolerance, INSENS mentioned above and the Multipath Routing scheme described in Ganesan, D., Govindan, R., Shenker, S., and Estrin, D., "Highly Resilient, Energy Efficient Multipath Routing in Wireless Sensor Networks", Mobile Computing and Communication Review, No. 2, 2002 ("Ganesan"), propose multiple path routing.

Using these schemes, even though a small number of nodes may fail, the failure does not cause widespread damage in the network since there may be alternate paths for routing a packet from a sensor node to a base station.

However, Ganesan only discloses a method for responding to a failure of a node or group of nodes. No method is disclosed for responding to an adversary's attack. Further, no method is disclosed for a sensor node to determine a failure. Ganesan defines a failure as an absence of detection events, which may not be applicable during an attack. Further, a failure is determined not by a sensor node but by a sink, which is defined as a data processing or human interface device and may be similar to a base station. Moreover, building redundant routing paths may unnecessarily consume resources since all sensor nodes may build redundant routing paths where an identified failure does not impact many of the sensor nodes.

Accordingly, the existing security solutions fail to provide a solution for facilitating sensor network security at the sensor nodes.

SUMMARY OF THE INVENTION

This invention discloses a sensor network having node architecture to perform trust management of neighboring sensor nodes and to adapt a message route in response to the trust management process.

This invention also discloses a method for performing trust management of neighboring sensor nodes in a wireless sensor network.

This invention also discloses a method for determining a secure route for packet transmission accounting for the trust management neighboring sensor nodes.

Additional features of the invention will be set forth in the description which follows, and in part will be apparent from the description, or may be learned by practice of the invention.

The present invention provides a wireless sensor network including a base station and a plurality of sensor nodes for relaying information to the base station, the sensor nodes including a first sensor node, a second sensor node, and a third sensor node arranged proximate to each other. Further, the first sensor node includes a radio transceiver for transmitting a message to the base station, a trust estimator for determining a trust value of the third sensor node, and a security responder for modifying a route for the message in response to the trust value of the third node.

The present invention also provides a method for determining a trust value of a first sensor node. The method includes determining a cryptographic operation checking packet parameter of the first sensor node, determining an interactive behavior availability parameter of the first sensor node, determining a personal reference value of the first sensor node by summing a weighted value of the cryptographic operation checking packet parameter and a weighted value of the interactive behavior availability parameter, receiving a jury reference value of the first sensor node, and summing a weighted value of the personal reference value and a weighted value of the jury reference value.

The present invention also provides a method for determining a signal route from a first sensor node to a base station in a wireless sensor network. The wireless sensor network includes a plurality of sensor nodes arranged randomly. The method includes receiving a signal requesting route maintenance, searching for a sender of the signal requesting route maintenance in a black node list, and comparing a cost of transmitting the signal from the first sensor node to the base station via the sender and a cost of transmitting the signal from the first sensor node to the base station via a preexisting parent node of the first sensor node.

The present invention also provides a sensor node in a wireless sensor network including a radio transceiver for transmitting a message, a trust estimator for determining a trust value of a neighboring sensor node, and a security responder for comparing the trust value of the neighboring sensor node with a trust value threshold.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 2 shows a portion of parameters that may be included in a parameter database of the sensor node architecture according to an exemplary embodiment of the present invention.

FIG. 5 shows an algorithm for determining an Ordering parameter according to an exemplary embodiment of the present invention.

DETAILED DESCRIPTION OF THE ILLUSTRATED EMBODIMENTS

Figure 1:
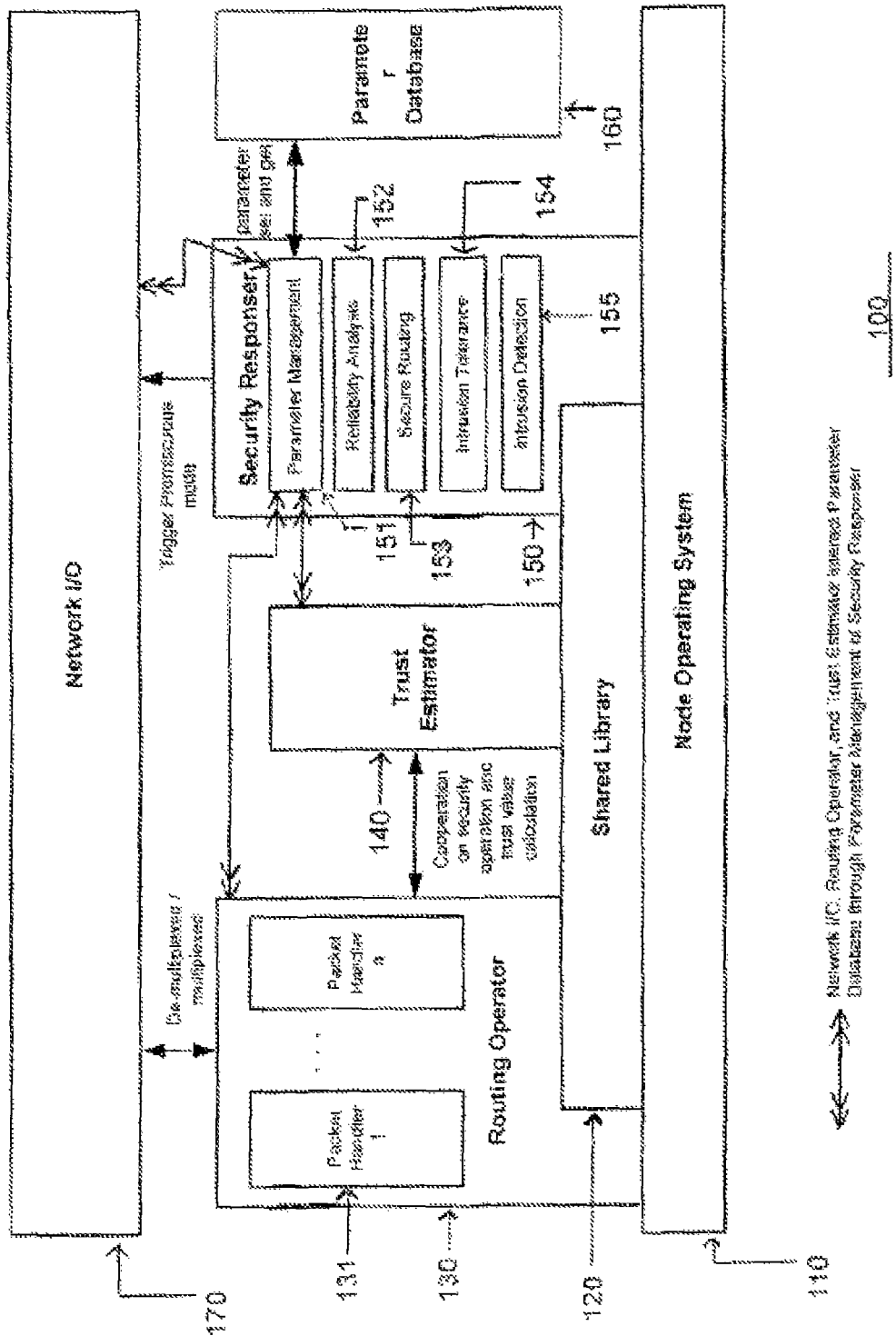
FIG. 1 shows sensor node architecture according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 shows sensor node architecture according to an exemplary embodiment of the present invention.

As shown in FIG. 1, the node architecture 100 may be arranged to perform an adaptive method for maintaining sensor network security and evaluating trustworthiness of neighboring sensor nodes.

The node architecture 100 may include a Parameter Database 160, a Shared Library 120, a Node Operating System 110, and four components for performing logic operations including a Network Input/Output (I/O) component 170, a Routing Operator 130, a Trust Estimator 140, and a Security Responser 150.

Parameter Database 160

The Parameter Database 160 may store parameters related to performing the method for maintaining sensor network security and evaluating trustworthiness of neighboring sensor nodes. The Parameter Database 160 may store the parameters in rewriteable memory. Although storing parameters in memory consumes resources of the sensor node, using parameterization to quantify, mange, visualize and recall the abundant available information may consume less memory than transceiving lengthy describing code including the information related to the parameters.

Parameters stored in the Parameter Database 160 may be classified into at least two categories. The first category may be infrequently-changed parameters, such as parameters that define the operational environment, including whether the environment is benign or hostile, and some trust related attributes such as predefined trust levels and thresholds between trust levels used in evaluating trustworthiness of neighboring sensor nodes. The second category may include more frequently-changed parameters, such as network status, including network connectivity for a sensor node, and local information of the sensor node such as resource availability and neighbor trustworthiness.

FIG. 2 shows a portion of a list of parameters that may be stored in the Parameter Database 160. The parameters listed in FIG. 2 may include describing parameters for a neighboring sensor node. A unit parameter may be represented by a single numerical value, and a union parameter, which includes interrelated unit parameters, may be identified by an ampersand (&) at the front of the parameter identifier.

Trust Estimator 140

Figure 3:
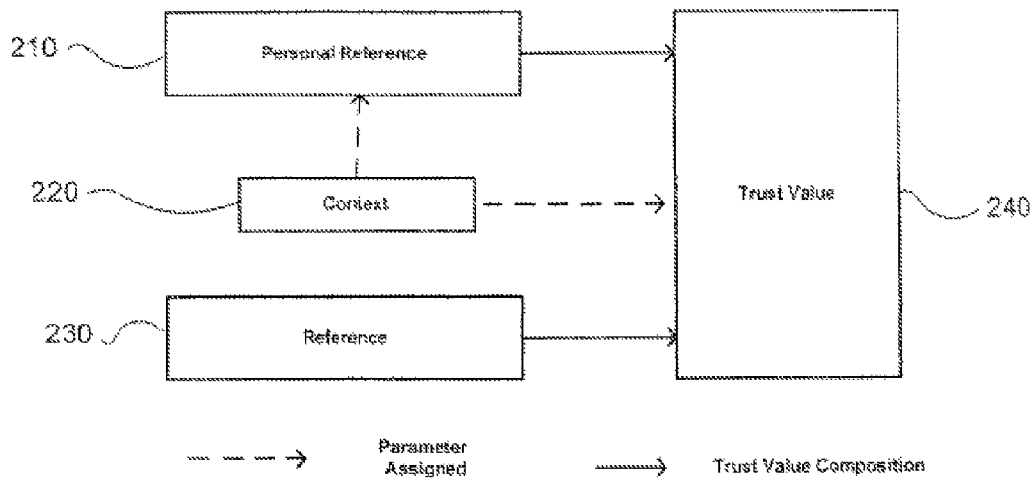
FIG. 3 shows a distributed trust mode according to an exemplary embodiment of the present invention.

The Trust Estimator 140 may allow a sensor node to perform a security-based trust evaluation of the sensor node's neighboring sensor nodes. The Trust Estimator 140 may be based on a localized trust model, as shown in FIG. 3.

In the localized trust model, a first sensor node, the judge, may perform a trust evaluation of a neighboring second sensor node, the suspect. The second sensor node may be within radio range of the judge to deemed a neighbor of the judge. A third sensor node, the jury, who is also a neighbor of the suspect, may store a trust value of the suspect and may transmit the third sensor node's trust value of the suspect to the judge. Additional sensor nodes may be part of the jury where more than one sensor node is arranged within a radio range of the suspect. Where many juries transmit trust values to the judge, the judge may factor these trust values according to the judge's own trust values for the respective sensor nodes of the jury. The transmission of the jury's trust value to the judge may be in response to a request from the judge (active protocol, explained in further detail below) or may be in response to a change in the jury's trust value of the suspect (anti-active protocol, explained in further detail below).

The designation of the judge, suspect, and jury is not permanent and may change depending on the sensor node performing the trust evaluation. For example, the second sensor node may perform a trust evaluation of the first sensor node. In this instance, the second sensor node may be designated the judge and the first sensor node may be designated as the suspect. The third sensor node may remain the jury in these circumstances, but the transmitted trust value from the jury may be a trust value of the first sensor node rather than the second sensor node.

Because a trust value may not be symmetric, the first sensor node's trust value for the second sensor node may be different from the second sensor node's trust value for the first sensor node.

The localized trust model 200 shown in FIG. 3 may include at least two features for a judge to establish a Trust Value 240 for a suspect: recommendation-based trust and trust-based recommendation. The judge may determine a Personal Reference 210, or a trust-based recommendation, and may receive a Reference 230, or a recommendation-based trust value, from at least one other sensor node, which is part of a jury. The Personal Reference 210 may be determined from the judge's direct interaction with the suspect. For example, the judge may trust evaluate the suspect by evaluating a packet that originates or is forwarded from the suspect. Additionally, the Personal Reference 210 may be determined from the judge's observation of the suspect. Reference 230 may be obtained by combining and factoring Personal Reference 210 values determined and forwarded by sensor nodes forming the jury. Because a judge's Personal Reference 210 value for a suspect may also be transmitted as the judge's Reference 230 for the suspect when another sensor node requests a Reference 230 for the suspect, processing resources and memory resources may be conserved.

Figure 4:
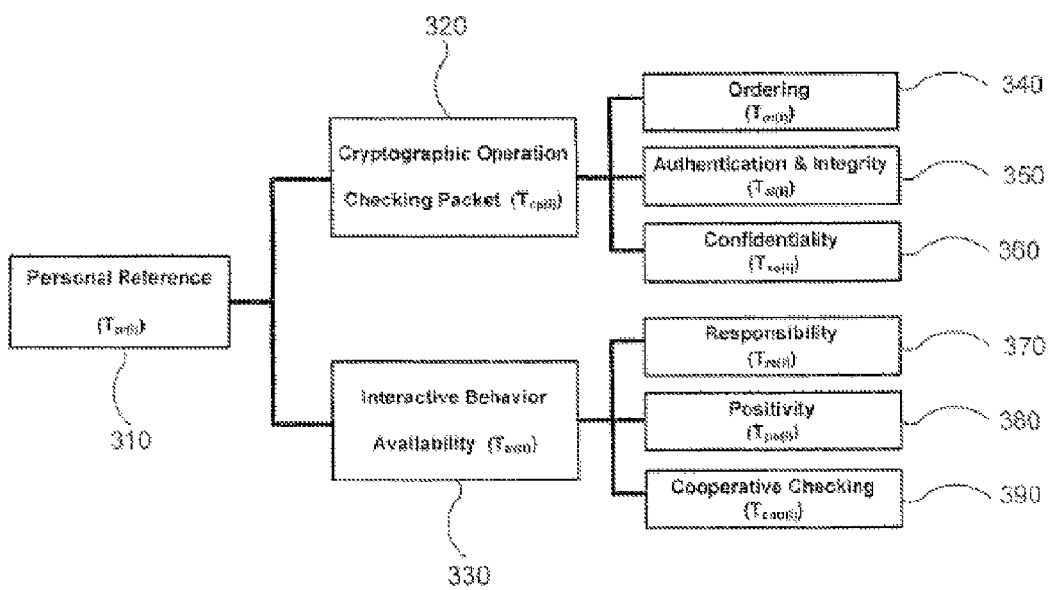
FIG. 4 shows a parameter tree for determination of a personal reference according to an exemplary embodiment of the present invention.

FIG. 4 shows a parameter tree for determination of a Personal Reference 210.

Referring to FIG. 4, parameters used for determining a Personal Reference 210 may be one of two types of parameters: parameters about cryptographic operations 320, which represent the security mechanisms used in transmission of packets, and can disclose attacks (e.g. message forgery and modification); and parameters about sensor node interactive behavior 330, which can reflect node availability, and reveal attacks such as dropping attacks and denial-of-service (DOS) attacks.

An Ordering parameter, $T_{or(i)}$, may represent whether a packet forwarded by suspect i is from the base station and whether the packet contains fresh information. Fresh information may be information that has been transmitted from the base station and without substantial delay before being received by the sensor node determining the Personal Reference 210. Since control packets may be sent by the base station, the identity of base station may be verified by the sensor node.

The base station may encode a packet to be transmitted to sensor nodes with a hashed sequence number (HSN) having a characteristic of a hash function. A sensor node, upon receiving a packet from the base station, such as a topology discovery command, may determine whether the HSN represents a fresh packet. A detailed algorithm for evaluating whether the HSN represents a fresh packet is shown in FIG. 5. Upon completion of the algorithm, the sensor node may update the Ordering parameter, $T_{or(i)}$, with a value of 1, 0, or a decimal therebetween according to a number of packets from that base station that were lost.

In some cases a packet transmitted out from the base station may traverse only a certain subset of the network, thus being received by only select sensor nodes. Further, packet loss may be caused for another reason, such as a physical problem like a damaged or inoperable sensor node. Therefore, a decay function for determining an Ordering Parameter $T_{or(i)}$ and an operation time between received packets may be developed to account for physical problems without erroneously determining a low trust value for a suspect.

An Authentication & Integrity parameter, $T_{ai(i)}$, may represent whether a received packet is modified by a suspect by checking a message authentication code (MAC) embedded in the packet against a corresponding key. Where the MAC matches the corresponding key, an Authentication & Integrity parameter, $T_{ai(i)}$, may be set equal to 1. Where the MAC does not match the corresponding key, an Authentication & Integrity parameter, $T_{ai(i)}$, may be set equal to 0.

A Confidentiality parameter, $T_{co(i)}$, may indicate whether a ciphertext in a received packet may be decrypted to meaningful plaintext with the corresponding key. Where decrypting may result in meaningful plaintext, a Confidentiality parameter, $T_{co(i)}$, may be set equal to 1. Where decrypting does not result in meaningful plaintext, a Confidentiality parameter, $T_{co(i)}$, may be set equal to 0.

A Cryptographic Operation Checking Packet parameter, $T_{cp(i)}$, may indicate the correctness of the incoming packet from suspect i. Since a suspect may change its behavior and thus its trust value over time, the Cryptographic Operation Checking Packet parameter represents a portion of the Personal Reference 210 at a specific time only. Hence, the judge may store the $T_{cp(i)}$ parameter for the last predetermined number of packets received from suspect i to obtain a statistic value, which may represent a portion of the Personal Reference 210, represented by:

$$T_{cp(i)} = T_{or(i)} \times (T_{ai(i)} \cap T_{co(i)})$$

In sensor networks, sensor nodes may perform network functions through cooperation. Thus, sensor nodes that drop the forwarded packets or mount denial-of-service (DOS) attacks to send out duplicated packets may be identified and isolated to maintain cooperative operation of the sensor network. Hence, sensor node interactive behavior may be evaluated and determined as an Interactive Behavior Availability parameter, $T_{av(i)}$, determined through the following parameters.

A Responsibility parameter, $T_{re(i)}$, may indicate whether judge j can receive a reply packet from the base station through suspect i, once the judge transmits a request for information to the base station, such as a shared key update. A Responsibility parameter, $T_{re(i)}$, may be determined to be a value of 1, 0, or a decimal therebetween based on the following equation:

$$T_{re(i)} = \frac{number\_of\_replies}{number\_of\_requests}$$

A judge may discard packets with non-fresh HSN values. Thus, either a suspect's malicious behavior or packet loss may decrease the Responsibility parameter. Further, packet loss may be caused by some fault other than the suspect's malicious behavior, such as network congestion or wireless interference, and the Responsibility parameter, $T_{re(i)}$, may be adjusted to account for non-malicious packet loss.

A Positivity parameter, $T_{po(i)}$, may indicate node positivity by base station. Node positivity may refer to whether a sensor node may participate in the exchange of communications between sensor nodes, and a low Positivity parameter may disclose a selfish suspect. To obtain the Positivity parameter, $T_{po(i)}$, an interval with minima and maxima [min, max] may be established to represent active intercommunication times between network elements in a unit time interval. Judge may compute actual times of active intercommunication between itself and the suspect and may determine the Positivity parameter, $T_{po(i)}$, according to the following equation:

$$T_{po(i)} = \{1 \text{ if } times_{(i)} \in [min, max],$$
$$T_{po(i)} = \{\frac{times_{(i)}}{min} \text{ if } times_{(i)} < min, \text{ and}$$
$$T_{po(i)} = \{\frac{max}{times_{(i)}} \text{ if } times_{(i)} > max.$$

A Cooperative Checking parameter, $T_{coo(i)}$, may be obtained while the sensor node is operating in a promiscuous mode. However, because of the additional energy consumption while a sensor node is operating in the promiscuous mode and because of the low-resource nature of sensor nodes, the promiscuous mode may only be entered when a Positivity parameter and a Responsibility parameter fall outside a normal value. A sensor node may operate in the promiscuous mode in response to a trigger message transmitted from the Security Responser 150 to the Network I/O 170.

When operating in a promiscuous mode, the judge may route packets, intended for another sensor node, to the suspect and monitor whether the suspect correctly forwards the packets. The judge may also impose a time restriction on the suspect for correctly forwarding the packets. The Cooperative Checking parameter, $T_{coo(i)}$, may be obtained from a forwarding ratio fr and a decay function D(x) where x, $D(x) \in [0,1]$.

$$f_r = \frac{number\_of\_packets\_actually\_forwarded}{number\_of\_packets\_transmitted\_from\_judge}$$

$$T_{coo(i)} = D(f_r) \text{ where } fr < 1$$

$$T_{coo(i)} = D\left(\frac{1}{f_r}\right) \text{ where } fr \geq 1$$

An Interactive Behavior Availability parameter, $T_{av(i)}$, may indicate the availability of suspect i. It may be calculated by weighting the above three values and summing them. Since the Cooperative Checking parameter may be a value that more accurately represents the trust value of the suspect, it may receive additional weight. However, because the Cooperative Checking parameter may only exist when the judge is operating in a promiscuous mode, the Interactive Behavior Availability parameter, $T_{av(i)}$, may be calculated by weighting the Positivity parameter and the Responsibility parameter and summing them.

A weighted summation of all three values may be established according to the following formula:

$$T_{av(i)} = T_{po(i)} \times W_{po} + T_{re(i)} \times W_{re} + T_{coo(i)} \times W_{coo}$$

where the sum of Positivity parameter weight factor and Responsibility parameter weight factor $W_{po} + W_{re} = 0.5$ and Cooperative Checking parameter weight factor $W_{coo} = 0.5$ When the judge is not operating in a promiscuous mode, a weighted summation of the Positivity parameter and the Responsibility parameter may then be established according to the following formula:

$$T_{av(i)} = T_{po(i)} \times W_{po} + T_{re(i)} \times W_{re}$$

where the sum of Positivity parameter weight factor and Responsibility parameter weight factor $W_{po} + W_{re} = 1.0$ The weight factors $W_{po}$, $W_{re}$, and $W_{coo}$ may be adjusted based on specific sensor network applications. For example, a sensor network may be classified by a type of data delivery such as continuous, event-driven, request-reply, or a hybrid of these three. These weight factors may be adjusted according to the type of data delivery. For example, in a continuous type of sensor network, $W_{re}$ may be weighted lower than $W_{po}$.

The judge may then compute the Personal Reference 210 value through a weighted summation of the two main parameters: the Interactive Behavior Availability parameter, $T_{av(i)}$, and the Cryptographic Operation Checking Packet parameter, $T_{cp(i)}$:

$$T_{pr(i)} = T_{cp(i)} \times W_{cp} + T_{av(i)} \times W_{av}$$

where the sum of Operation Checking Packet parameter weight factor and Interactive Behavior Availability parameter weight factor $W_{cp} + W_{av} = 1.0$ The judge may also determine a Reference 230, or a recommendation-based trust value, from at least one other sensor node, which is part of a jury. To obtain a Reference 230 from the sensor nodes of the jury, a recommendation protocol may specify how the exchange of trustworthy information between the judge and jury happens. Such recommendation protocol may be initiated by the Security Responser 150 in response to one of at least two activities, and may be classified as an active protocol or an anti-active protocol.

First, to initiate an active protocol, a judge may transmit a request message requesting a Reference 230 from the jury nodes. The message may include an identifier of the suspect and an identifier of the judge. Upon receiving the request message, a jury node may transmit a reply message to the judge. The reply message may include the identifier of the suspect, an identifier of the jury node, and the jury node's trust value of the suspect. The judge may wait a predetermined time, which may be controlled by a timer, to receive reply messages from the jury nodes that are neighbors of the suspect. After receiving reply messages from the jury nodes, the judge may compare each jury node with a list of sensor nodes known to the judge and stored in the Parameter Database 160. Where the judge does not know a sensor node acting as a jury node, the judge may delete that jury node's reply message without using that jury node in determining a Reference 230 or may adjust that jury node's trust value. The jury nodes remaining after the judge has deleted unknown sensor nodes may be referred to as valid jury nodes. The judge may then calculate a Reference 230 from the valid jury nodes.

Second, to initiate an anti-active protocol, a judge may transmit an information message informing the neighboring jury nodes of observed and possibly malicious behavior by a suspect. The information message may include an identifier of the suspect, a code related to identify the possibly malicious behavior by the suspect, and a trust evaluation of the suspect. A jury node, upon receiving the information message, may compare its trust evaluation of the suspect against the judge's transmitted trust evaluation of the suspect. In response, a jury node may transmit a reply message representing either an agreement with the judge or a disagreement with the judge on the trust evaluation of the suspect. Where a number of the valid jury nodes, as determined according to the method described above, disagree with the judge, the judge may recalculate a Reference 230 of the suspect based on the jury node replies.

Because the jury nodes may not be trusted by the judge, the judge may disregard reply messages received from untrustworthy jury nodes. Further, the judge may adjust replies by an adjustment factor based on a trust level of the jury node transmitting a trust value of the suspect. The adjustment factors may be represented by: $AF_l$ where l=1, 2, 3, or 4 and $AF_l \in (0, 1)$. Therefore, where m jury nodes are valid and transmit a trust value of the suspect, a Reference 230 value $T_{r(i)}$, may be calculated by the following equation:

$$T_{r(i)} = \frac{\sum_{k=1}^{m} AF_{lk} \times T_{(i)k}}{m}$$

Thus, the judge can determine the trustworthiness of the suspect by calculating a trust value from a weighted summation of the Personal Reference 210 and the Reference 230. Weight factors for determining the trustworthiness of the suspect may be stored or updated in the Parameter Database 160 and may be transmitted through Parameter Management 151 of the Security Responser 150 to the Trust Estimator 140. Thus, the trust value may be calculated using the following equation:

$$T_{(i)} = T_{pr(i)} \times W_{pr} + T_{r(i)} \times W_r$$

where the sum of the personal reference weight factor and reference weight factor $W_{pr} + W_r = 1.0$ Returning to the node architecture of FIG. 1, the Network I/O 170 may receive packets transmitted from other sensor nodes or from the base station, and may transmit packets to the Routing Operator 130. The Routing Operator 130 may route the packets to the appropriate Packet Handler 131 according to a mapping between packet type and Packet Handler 131. The Network I/O 170 may also transmit packets to another sensor node, control the data transfer rate or rate of incoming and outgoing packets specified by rate parameters stored in the Parameter Database 160, or may monitor behavior of certain suspects as directed by the Security Responser 150. The Network I/O 170 may also transmit received packets to the Trust Estimator 140 through the Routing Operator 130 so the Trust Estimator 140 may perform trust evaluations and monitor behavior of suspect sensor nodes.

Data messages in received packets may be de-multiplexed when transferred from the Network I/O 170 to the Routing Operator 130. Further, data messages to be transmitted in packets may be multiplexed when transferred from the Routing Operator 130 to the Network I/O 170.

The Network I/O 170 may provide system configuration parameters to the Parameter Database 160 for storage. The system configuration parameters may be updated by or transmitted to Parameter Management 151 of the Security Responser 150.

Additionally, the Network I/O 170 may discard packets after checking a black Node List parameter and determining that a received packet was transmitted by a sensor node listed on the black Node List. The black Node List may represent a parameter of the Parameter Database 160 whereby identifiers of sensor nodes with low trust values may be stored.

Routing Operator

The Routing Operator 130 may include a series of Packet Handlers 131, where each Packet Handler 131 corresponds to a different type of packet.

Each Packet Handler 131 may demultiplex an incoming packet or may multiplex an outgoing pack. A Packet Handler 131 may perform both functions on a packet, for example where the packet is relayed through the sensor node en route to the base station.

Herein, only the security operations processed on the packets will be addressed. Since the security processes disclosed herein may increase a processing load on the sensor nodes, the processing load may not be increased significantly due to assignment of security levels tailored to different types of packets. An example of these Security Levels is shown in Table 1.

TABLE I

Security Level Regulation Table

| Security Level | Security Operations |
|---|---|
| I | OWS & ENC & MAC |
| II | ENC & MAC |
| III | ENC |

For example, Security Level I may be used for protocol packets carrying information related to topology construction, and may be initialized by the base station rather than from sensor nodes, and with little data attached thereto. Security Level II may be used for sensing packets carrying sensed data and transmitted from sensor nodes to other sensor nodes and to the base station. Security Level III may be used for trust recommendation exchange packets primarily communicated between sensor nodes that neighbor each other. The MAC security operation, which may verify the integrity of the message embedded in the packet, may be omitted for trust recommendation exchange packets at Security Level III because trust recommendation exchange packets only perform a single hop from one sensor node to a neighboring sensor node, and a MAC operation may unnecessarily increase the packet length. The one-way sequence (OWS) operation may also be omitted as the OWS operation is generally carried out only by the base station to ensure that packets are fresh and are originating from the base station. The encryption (ENC) operation may be included to prevent attack from an intruder or taint the trust recommendation exchange packets.

Security Responder 150

The Security Responder 150 may include components for performing actions related to the sensor network. For example, the Security Response 150 may include a Parameter Management component 151, a Reliability Analysis component 152, a Secure Routing component 153, an Intrusion Tolerance component 154, and an Intrusion Detection component 155.

The Parameter Management component 151 of the Security Responder 150 may control policies for parameter management. For example, the parameters in the Parameter Database 160 may be stored as a result of initial settings upon initialization of the sensor network or may be determined on the basis of updatable calculation. Since some parameters stored in the Parameter Database 160 may be updated, a set of policies may regulate the updating of the configurable parameters, and trigger corresponding actions as a result of parameters stored or updated in the Parameter Database 160.

Herein, the management of trust values will be a focus of the Security Responder 150. First, a trust level algorithm reflecting the trust relationship between neighboring sensor nodes may be established. Because of the many complexities of packet relaying in a wireless sensor network, including the dynamic nature of sensor networks and the unreliable wireless communication link, there may not be a sensor node that is absolutely trusted or absolutely distrusted by neighboring sensor nodes. Further, trust levels may be application-dependent. Thus, a trust level algorithm may be defined and tailored to be uniquely applicable to a desired application.

Therefore, a general Trust Level algorithm as shown below in Table II may be configured to correspond to targeted application characteristics.

TABLE II

Trust Level Algorithm

| Trust Level | Name | Description | Trust Value |
|---|---|---|---|
| 1 | Distrust | Untrustworthy | $(0, r_1]$ |
| 2 | Minimal | Low Trust | $(r_1, r_2]$ |
| 3 | Average | Common Trustworthy | $(r_2, r_3]$ |
| 4 | Good | Trustworthy | $(r_3, 1]$ |

Applying the Trust Level algorithm of Table 2 to a military application for example, higher security requirements may be necessary. Accordingly, a range of Untrustworthy and Low Trust levels may be increased to rapidly remove low trust sensor nodes of a route for transmitting packets. As applied, a lightweight trust evolution algorithm may be established for the sensor nodes on the assumption that every sensor node trusts its neighbors initially.

Now, an action by a sensor node in response to a Trust Value range for a Trust Level algorithm will be described. Just as a range of Untrustworthy and Low Trust Levels may be adjusted according to the type of sensor network, network condition, or environment in which the sensor network is to be deployed, an activated protocol in response to a Trust Level may be modified by the Security Responser 150. Thus, the invention is not to be limited to these actions, which are provided only as an example.

If a trust value for a neighboring sensor node is within the Trust Value range for Trust Level 4, the sensor node may continue to communicate with the neighboring sensor node.

If the trust value for a neighboring sensor node falls to within the Trust Value range for Trust Level 3 from Trust Level 4, the sensor node may trigger a promiscuous mode, protocol, or algorithm if the reduction in Trust Level is caused by problematic interactive behavior. Alternatively, the sensor node may trigger the anti-active protocol.

If the trust value for a neighboring sensor node falls to within the Trust Value range for Trust Level 2 from Trust Level 4 or from Trust Level 3, the sensor node may trigger an anti-active protocol. If the final Trust Value calculated remains within the Trust Value range for Trust Level 2, the neighboring sensor node may be marked as black node. An identifier for the neighboring sensor node may be stored in a black node log. No additional calculations may be processed by the sensor node for the neighboring sensor node.

If the trust value for a neighboring sensor node falls to within the Trust Value range for Trust Level 1 from Trust Level 4, from Trust Level 3, or from Trust Level 2, the sensor node may trigger the active protocol. If the final Trust Value calculated remains within the Trust Value range for Trust Level 1, the neighboring sensor node may be marked as black node. An identifier for the neighboring sensor node may be stored in a black Node List. No additional calculations may be processed by the sensor node for the neighboring sensor node unless some positive behavior may be calculated.

The Security Responser 150 also may compare parameters with predefined thresholds, such as the thresholds used to compute a suspect's positivity, to select an appropriate operation. For example, with a very dense network and a large number of neighbors surrounding a given sensor node, performing security operations as described above may consume an undesirable amount of sensor node resources such as processing resources and memory resources. Accordingly, a sensor node may establish and define, based on memory availability for security operations, a maximum number of neighbors or a maximum number of neighbors that are not on a black Node List. Consequently, algorithms may be necessary to add new neighbors and delete old, bad, non-operating or damaged neighbors.

Thus, through the management of the Parameter Database 160, the Security Responder 150 may analyze neighboring node behavior, adopt appropriate cryptographical mechanisms, select an appropriate next hop based on trustworthiness, trigger monitoring mechanisms to detect malicious behavior, and properly adopt redundancy to achieve intrusion tolerance.

Shared Library

The Shared Library 120 may be constructed by the sensor node to store common functions and operations for the Routing Operator 130, the Trust Estimator 140, and the Security Response 150. These three components may request these common functions and operations from the Shared Library 120.

Simulations were carried out to validate the performance of the trust evaluation methods described herein. In the simulated sensor network, nodes were randomly distributed with a uniform density, and were randomly scheduled to act as a traffic source in a data collection application. The location of the base station was positioned in random locations throughout the wireless sensor network during various iterations of these simulations. The locations of the malicious nodes were also positioned randomly. The simulations were performed one-hundred times and the results represent an average of the simulations. The main simulation parameters are specified in Table 3.

TABLE III

Simulation Parameters

| | |
|---|---|
| Simulation Area | 140 meters by 140 meters |
| Number of Nodes | 100 |
| Ratio of Malicious Nodes | 2% |
| Transmission Range of each node | 30 meters |

In the Malicious Attack Simulation, packet dropping, packet modification, and denial-of-service attacks were implemented at the malicious nodes. This Malicious Attack Simulation may simulate a similar attack implemented by a sensor node inserted into the sensor network by an adversary or a sensor node in the sensor network that is compromised by an adversary.

In the Dropping Attack Simulation, a malicious node may receive packets and extract information such as the sensing data from the packets. However, the malicious node may not forward the packets intended to be transmitted to another sensor node or to the base station. As a result, sensor nodes that use the malicious node as a relay for transmitting a message to the base station may not be able to transmit sensing data to the base station.

In the Modification Attack Simulation, the malicious node may receive packets and extract information such as the sensing data from the packets. However, the malicious nodes may then add, alter, or delete information stored in received packets prior to transmitting the packets to another sensor node or to the base station. As a result, sensor nodes that use the malicious node as a relay for transmitting a message to the base station may not be able to transmit accurate sensing data to the base station. Further, these sensing nodes will continue to transmit inaccurate sensing data in the corrupted packets. Thus, energy will be consumed in forwarding corrupted packets and more nodes may be infected.

In the Denial-of-Service (DOS) Attack Simulation, a malicious node may transmit frequent unnecessary traffic with random destinations to its neighbors, and may request the neighbors to forward or process packets to consume the resources of the neighbors. Many nodes may be affected to consume memory, power, and processing resources.

During the simulation attacks, two metrics were measured. First, the number of nodes affected by the attacks were measured. Specifically, the number of nodes whose packets were corrupted prior to delivery to the base station or were not delivered to the base station was measured.

Second, the number of wasted packets was measured. Each packet transmitted from one sensor node to another sensor node (hop-to-hop transmission) was treated as a packet, and a wasted packet may represent one of two kinds of packets: packets discarded prior to reaching an intended delivery location (generally the base station) and packets that are corrupted prior to reaching an intended delivery location. There may be at least three categories of packets: one type of packet transmits sensed conditions and carries sensing data; a second type of packet transmits topology control data; a third type of packet transmits signals related to trust relation maintenance. Packets transmitting topology control data are transmitted primarily during a network formation period and may not be wasted. Packets transmitting signals related to trust relation maintenance may only be generated for transmission between neighboring sensor nodes for one-hop communication. Therefore, packets carrying sensing data may be most susceptible to corruption.

Simulation Result and Analysis

Figure 6:
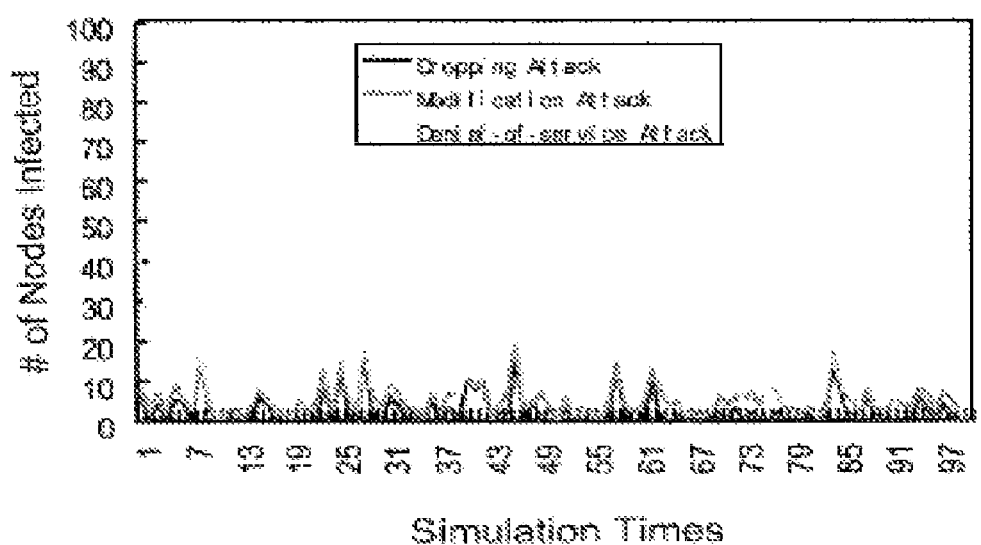
FIG. 6 shows a graph of infected nodes caused by three types of simulated attacks: dropping attack, modification attack, and denial-of-service attack.

FIG. 6 shows the number of infected nodes caused by the three simulated attacks. Among them, the malicious nodes performing the DOS attack may infect nearly 30% of the healthy (i.e. non-malicious) nodes in the network. For comparison, malicious nodes performing the modification attack infected approximately 5% healthy nodes, and malicious nodes performing the dropping attack infected approximately 2.5% of healthy nodes.

Figure 7:
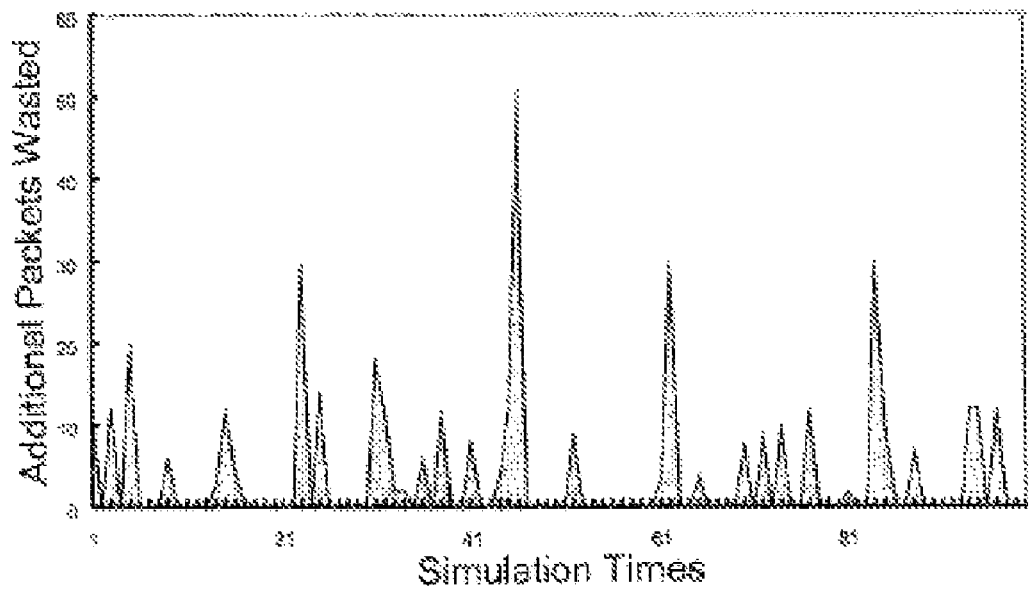
FIG. 7 shows a graph of additional transmission hops wasted comparing dropping attack to modification attack.

As shown in FIG. 7 the wasted transmission hops caused by the modification attack are nearly three times more than the wasted transmission hops caused by the dropping attack.

Figure 8:
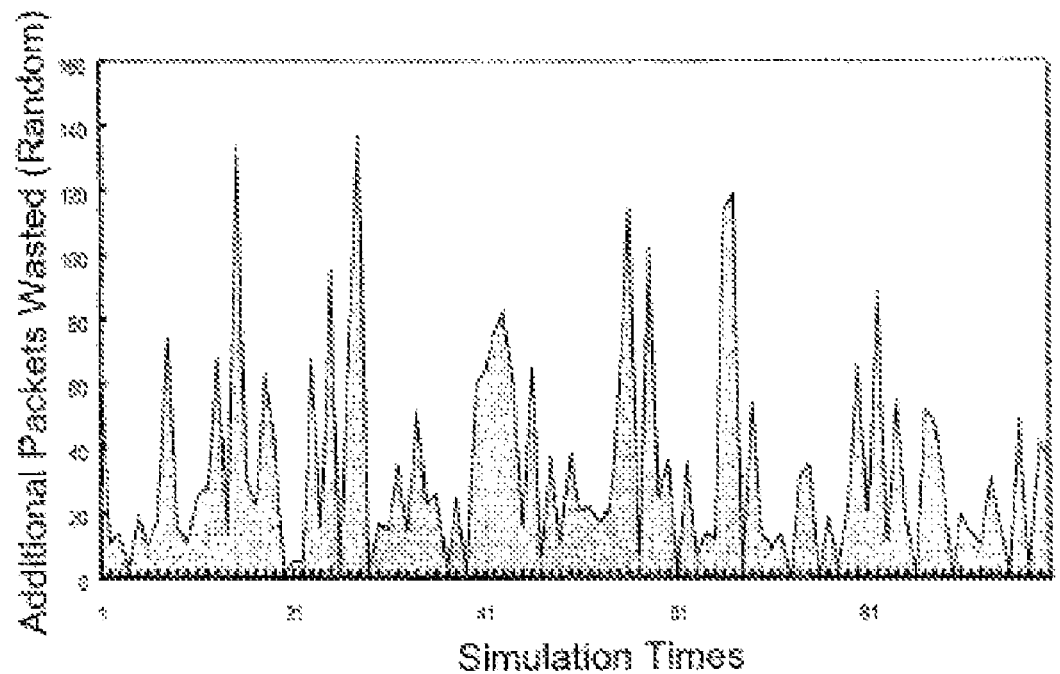
FIG. 8 shows a graph of additional transmission hops wasted comparing dropping attack to denial-of-service attack.

As shown in FIG. 8, the wasted transmission hops caused by the DOS attack are over 33 times more than the wasted transmission hops caused by the dropping attack.

Trust Value Deduction

Figure 9:
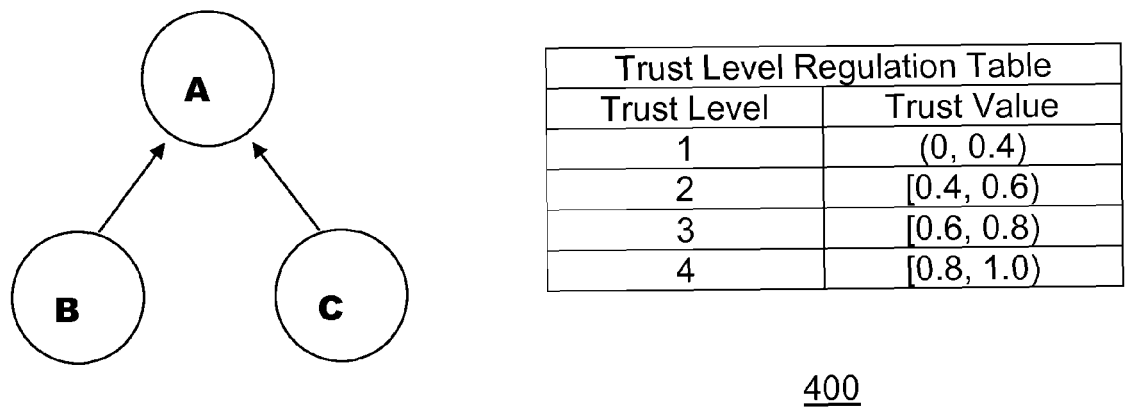
FIG. 9 shows a wireless sensor network sensor node arrangement and a Trust Level Regulation Table according to an exemplary embodiment of the present invention.

FIG. 9 shows a wireless sensor network sensor node arrangement and a Trust Level Regulation Table, similar to the Trust Level Algorithm table shown in Table II, according to an exemplary embodiment of the present invention. The Trust Level Regulation Table shown in FIG. 9 has a Trust Level 2 threshold of 0.6, which may indicate that the Trust Level Regulation Table is established for a sensitive operation where malicious nodes are to be identified more rapidly than if the Trust Level 2 threshold were lower.

Figure 10:
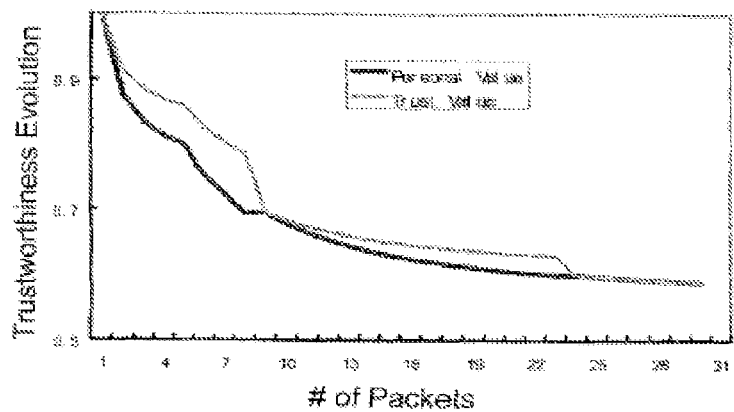
FIG. 10 shows a graph of trustworthiness evaluation of a malicious node versus a number of evaluations.

As shown in FIG. 9, node A may be a malicious sensor node that may perform a dropping attack, and sensor node B and sensor node C are arranged downstream from sensor node A. Sensor node A, sensor node B, and sensor node C are mutual neighbors. Sensor node B may evaluate the trustworthiness of node A and sensor node B may receive a reference from node C regarding sensor node A. FIG. 10 shows a relationship between sensor node B's trust evaluation of sensor node A and sensor node C's reference value of sensor node A. Further, FIG. 10 shows that malicious node A may be identified by a change from Trust Level 3 to Trust Level 2 according to the Trust Level Regulation Table shown in FIG. 9 after approximately 25 communications.

Secure Routing Protocol

A secure routing protocol for routing a packet from an origination node to a destination node or to base station is also disclosed herein, where the secure routing protocol may incorporate the trust evaluations performed by the judge as described above. A judge may perform a discovery protocol to determine its neighbor nodes and to establish an initial route for transmitting a packet to an intended destination, which may be the base station. Therefore, a judge may store an identity of a parent node in the judge's Protocol Database 160. A judge may also store a routing cost corresponding to transmitting a packet from the judge to the base station via the parent node.

After a route discovery process is complete and each sensor node has identified a route for transmitting a packet from each sensor node to the base station, and after trust relationships have been established between neighboring sensor nodes, a route maintenance protocol may be executed. The route maintenance protocol may be initiated by the base station with transmission of a route maintenance message. A sensor node may receive the route maintenance message, and generate a message including the sensor node's identifier, level identifier, and a trust value towards the base station. The level identifier may represent the number of hops required to transmit a message to the base station. For example, a sensor node that receives a route maintenance message from the base station may have a level identifier of one. The sensor node may operate as a sender and transmit a route packet to its neighbors. When a receiver, which is a neighboring sensor node to the sender, receives the route packet, the receiver may perform the same operations as the sender when the sender received the base station's route maintenance message.

However, the receiver may also check whether the sender of the route packet is stored in a black node list based on a low trust level of the sender. If so, then the receiver may select a parent node other than the sender to obtain a secure route even if the secure route may be longer than a route via the sender. If the sender is not a black node list, the receiver may perform a cost comparison protocol to compare a routing cost via the sender as a parent node against a routing cost of a route via the currently stored parent node. If the routing cost using the sender as a parent node is less than a routing cost of the route via the currently stored parent node, the receiver may store the sender as a new parent node in the receiver's Parameter Database 160.

The routing cost may be related to a sensor node's trust value of the sender and also to a sum of trust values for the nodes in the route.

As a result of the secure routing protocol, a sensor node may compare a routing cost based upon a trust value of another sensor node and may select a secure route without nodes suspected of malicious behavior.

Thus, according to the present invention, a sensor node in a sensor network may have node architecture for performing trust management of neighboring sensor nodes.

Further, according to the present invention, a sensor node in a sensor network may be configured to perform an adaptive method for evaluating and monitoring trust management of neighboring sensor nodes.

Further, according to the present invention, a sensor node in a sensor network may be configured to perform trust management of neighboring sensor nodes without consuming scarce resources.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A wireless sensor network, comprising:
   a base station; and
   a plurality of sensor nodes to relay information to the base station, the sensor nodes including a first sensor node, a second sensor node, and a third sensor node arranged proximate to each other,
   wherein the first sensor node comprises:
      a radio transceiver to transmit a message to the base station;
      a parameter database comprising memory to store a list of sensor nodes known to the first sensor node and parameters corresponding to the list of sensor nodes;
      a trust estimator to determine a trust value of the third sensor node; and
      a security responser to compare the trust value of the third sensor node with a trust value threshold, the security responser to determine whether to include the third sensor node in a packet transmission route from the first sensor node to a destination according to the comparison result,
   wherein the trust value is a value representing how much the first sensor node trusts the third sensor node, and
   wherein the security responser comprises a parameter manager to update and manage the parameter database according to policies for parameter management.

2. The wireless sensor network of claim 1, wherein the trust estimator determines a trust value of the third sensor node on the basis of a personal reference of the first sensor node and a reference of the second sensor node.

3. The wireless sensor network of claim 2, wherein the personal reference of the first sensor node comprises:
   a cryptographic operation checking packet parameter; and
   an interactive behavior availability parameter.

4. The wireless sensor network of claim 3, wherein the cryptographic operation checking packet parameter comprises:
   an ordering parameter;
   an authentication and integrity parameter; and
   a confidentiality parameter.

5. The wireless sensor network of claim 3, wherein the interactive behavior availability parameter comprises:
   a responsibility parameter; and
   a positivity parameter.

6. The wireless sensor network of claim 5, wherein the interactive behavior availability parameter further comprises a cooperative checking parameter.

7. The wireless sensor network of claim 3, wherein the personal reference of the first sensor node and the reference of the second sensor node comprise the same parameters.

8. The wireless sensor network of claim 1, wherein the first sensor node further comprises:
   a network input/output component to discard a message from a fourth sensor node when a trust value of the fourth sensor node has a low trust value.

9. The wireless sensor network of claim 1, wherein the first sensor node further comprises:
a shared library to store an algorithm for determining a trust value of the third sensor node.

10. The wireless sensor network of claim 1, wherein the trust value threshold corresponds to a low trust level.

11. A sensor node in a wireless sensor network, comprising:
a radio transceiver to transmit a message;
a parameter database comprising memory to store a list of neighboring sensor nodes known to the sensor node and parameters corresponding to the list of sensor nodes;
a trust estimator to determine a trust value of a neighboring sensor node; and
a security responser to compare the trust value of the neighboring sensor node with a trust value threshold, the security responser to determine whether to include the neighboring sensor node in a packet transmission route from the sensor node to a destination according to the comparison result,
wherein the trust value is a value representing how much the sensor node trusts the neighboring sensor node, and
wherein the security responser comprises a parameter manager to update and manage the parameter database according to policies for parameter management.

12. The sensor node of claim 11, further comprising:
a network input/output component to discard a message received from the neighboring sensor node.

13. The sensor node of claim 11, further comprising:
an algorithm stored in a library, the algorithm to determine a trust value of the neighboring sensor node.

* * * * *